(12) United States Patent
Tulchinskiy

(10) Patent No.: US 6,210,572 B1
(45) Date of Patent: Apr. 3, 2001

(54) FILTER AND METHOD FOR PURIFYING LIQUIDS CONTAINING MAGNETIC PARTICLES

(75) Inventor: Leonid Tulchinskiy, Brooklyn, NY (US)

(73) Assignee: Technology Commercialization Corp., New York, NY (US)

( * ) Notice: Subject to any disclaimer, the term of this patent is extended or adjusted under 35 U.S.C. 154(b) by 0 days.

(21) Appl. No.: 09/419,498

(22) Filed: Oct. 18, 1999

(51) Int. Cl.$^7$ ............................................. B01D 35/06
(52) U.S. Cl. .................... 210/223; 210/222; 210/295; 209/223.1; 184/6.25
(58) Field of Search .................. 210/222, 223, 210/69 S, 29 S; 209/223.1

(56) References Cited

U.S. PATENT DOCUMENTS

| | | | |
|---|---|---|---|
| 3,539,509 | * 11/1970 | Heitmann et al. | 210/222 |
| 3,841,489 | 10/1974 | Combest | 210/223 |
| 3,979,288 | 9/1976 | Heitmann . | |
| 4,036,758 | 7/1977 | Combest | 210/223 |
| 4,261,815 | 4/1981 | Kelland | 209/213 |
| 4,295,969 | 10/1981 | Hagberg | 210/223 |
| 4,298,478 | 11/1981 | Watson | 210/695 |
| 4,304,667 | 12/1981 | Dubourg | 210/223 |
| 4,363,729 | 12/1982 | Yano | 210/223 |
| 4,366,065 | 12/1982 | Leslie | 210/695 |
| 4,450,075 | 5/1984 | Krow | 210/223 |
| 4,629,558 | 12/1986 | Garritty | 210/130 |
| 4,663,029 | 5/1987 | Kelland | 209/214 |
| 4,759,842 | 7/1988 | Frees | 210/94 |
| 4,865,730 | 9/1989 | Lam | 210/222 |
| 4,904,381 | * 2/1990 | Urakami | 210/222 |
| 5,174,892 | 12/1992 | Davis | 210/131 |
| 5,568,869 | 10/1996 | Turkenich | 209/212 |
| 5,628,900 | * 5/1997 | Naito | 210/223 |

FOREIGN PATENT DOCUMENTS

| | | | |
|---|---|---|---|
| WO 97/20613 | 6/1997 | (WO) | B01D/35/06 |
| WO 97/22395 | 6/1997 | (WO) | B01D/35/06 |

OTHER PUBLICATIONS

L.N.Tulchinskii, et.al. Magnetic Field in a System of Spherical Magnetic Elements. Powder Metallurgy and Metal Ceramics, vol. 33, Nos. 5–6, 1994, pp. 291–299.

* cited by examiner

*Primary Examiner*—David A. Reifsnyder
(74) *Attorney, Agent, or Firm*—Boris Leschinsky

(57) ABSTRACT

A filter for removal of magnetic particles in which a liquid flows through a first compartment containing magnetic balls tightly packed together so that there is no direct flow path but only around these magnetic balls. Increased mixing of flow coupled with strong intensity of a magnetic field across the flow promotes better attraction and retention of the magnetic particles on the magnetic balls. The second compartment contains commonly known porous materials of known porosity to remove smaller non-magnetic particles. The filter is particularly useful as a fuel or oil filter for an internal combustion engine. In one embodiment, the magnetic portion is made removable and individually replaceable to extend the life of the filter. The filter is capable of removing magnetic particles for an extended period of time without clogging.

16 Claims, 2 Drawing Sheets

FILTER AND METHOD FOR PURIFYING LIQUIDS CONTAINING MAGNETIC PARTICLES

BACKGROUND OF THE INVENTION

1. Field of the Invention

The present invention relates generally to a filter for purifying various liquids containing magnetic particles, such as fuels, lubricants, and cooling liquids among others. Specifically, the invention relates to filters employing internal magnetic elements to trap such magnetic particles. The filter of the present invention can be used with particular success as a disposable fuel or oil filter for a device with limited energy resources such as an internal combustion engine.

2. Description of the prior art

Filtration of liquids has been widely described in the prior art. In addition to other contaminants, some liquids contain particles that are magnetic in nature. For the purposes of this description, a magnetic particle is defined as a small (generally less then 0.01 of an inch in diameter) particle that can be attracted and retained on the surface of such known permanent magnets as defined by a chemical formula of $SrFe_{12}O_{19}$, or $BaFe_{12}O_{19}$. Most of these magnetic particles fall in one of two categories: ferromagnetic particles such as Fe, Co, Ni, other metals and metal alloys as well as ferrimagnetic such as magnetic oxides $Fe_3O_4$, $\gamma\text{-}Fe_2O_3$, various ferrites, $CrO_2$ and alike.

Two particularly useful areas of filtration in which the present invention can be used most advantageously are the filtration of fuels such as gasoline, kerosine, diesel and alike as well as filtration of lubricants such as various oils.

Fluid filters are generally capable of removing contaminants having particle sizes above a given minimum size, while smaller particles pass through the filter medium. A balance must be struck between the lower size limit of retained particles and the flow rate allowed by the filter, because as the filter medium is constructed to retain smaller particles, the speed with which fluid flows through the medium is reduced. Therefore, it is simply not possible to remove all contaminants at practical rates of flow.

Metallic contaminants cause particular concern, because they may be very small, yet cause damage to the mechanism the filter is intended to protect. In, for example, an automotive engine, it is very important to remove minute metallic contaminants from the circulating lubricating oil to prevent damage to the internal engine components. Additionally, normal engine operation continually causes the production of additional metallic contaminants. The filter medium necessary to retain such metallic contaminants would cause excessive back pressure, and therefore, these fine metallic contaminants must be removed by another means.

It is also known that the majority of contaminating particles contain both magnetic elements such as metals as well as non-magnetic elements such as metal oxides. In fact, as metal particles enter the circulating liquid they undergo an oxidation process becoming less magnetic. Oxide particles are extremely hard and therefore particularly abrasive and damaging to an engine. Therefore, retaining both magnetic and partially magnetic particles is an important objective of a magnetic filter.

One alternative means of removing fine metallic particles from the fluid passing through the filter is to include a magnetic element in the filter that attracts and traps the metallic contaminants that exhibit magnetic attraction, such as iron, steel and their oxides, either before or after they pass through the filter medium. Various attempts have been made to incorporate a magnetic component in a filter.

Prior art magnetic filters that have included a magnetic element have generally done so by including some type of a bar magnet inside the filter assembly. For example, U.S. Pat. No. 3,279,607 by Michaelson discloses an automotive oil filter having one or more bar magnets disposed in one or more folds of the filter material, spaced equally around the circumference of the filter housing. Similarly, U.S. Pat. No. 4,501,660 by Hebert relates to an oil filter having a magnetized helical coil disposed in the central core of the filter assembly. An externally-attached magnetic element is disclosed by U.S. Pat. No. 5,282,963 by Hull, et al. A magnetic element sized to fit over the end of an oil filter housing is attached to the filter housing by magnetic attraction to metallic elements of the housing and filter. Similarly, U.S. Pat. No. 5,354,462 by Perritt relates to a strap that fastens around the outside of an oil filter housing to hold in place magnetic elements. U.S. Pat. No. 2,893,561 by Duzich relates to sheets of filter element material having small particles of magnetic material dispersed throughout the material or attached to the surface by impregnating the sheet with a polyvinyl acetate bonding agent.

These and other filters have inherent disadvantages, either in that they complicate the manufacturing process, cause increased back-pressure, or in that the magnetic elements are not optimally designed and placed relative to the fluid flow path so as to maximize the fluid contact with the magnetic element, and hence the removal of magnetically-attractive contaminants. Also, separately acting individual magnets do not produce strong enough magnetic field throughout the filter since the force that attracts a particle to a magnet falls off inversely proportional to the third degree of the distance from the center of magnet. Therefore, magnetic "blind spots" are inherently associated with the filters of the prior art.

Other attempts have been made to produce magnetic filters to remove some or all of the metallic and especially abrasive partially metallic particles circulating in the lubricating oil due to the normal wear occurring in an internal combustion engine or similarly to remove magnetic particles from the fuel fed into that engine.

U.S. Pat. No. 2,915,185 by Waldherr is directed to a fuel filter comprising an air dome and magnetic filter for automotive fuel pump lines, in which a magnet is provided in the dome in the path of the fuel. The fuel thus flows past the magnet and when the magnet becomes loaded with magnetic particles, there is a tendency for a surge of fuel to sweep away the collected particles, often in highly concentrated surges. Also such filters and domes are permanently connected to the engine, and thus have to be regularly dismantled, cleaned and reassembled as a periodical service.

A further fuel filter is shown in U.S. Pat. No. 2,914,178 by J. L. Edelen in which a magnet is positioned to allow the fuel to flow over the magnet, which also allows the particles to be swept away by the flood of fuel.

U.S. Pat. No. 3,186,549 by Botstiber, shows a permanent filter including magnetic filtration in which the liquid flows over the magnet and in which an indicating device is incorporated to give a signal when the filter is clogged or loaded. However, some collected particles could be swept away before the indication is given.

U.S. Pat. No. 2,823,803 by Sinclair et al, shows a permanent magnetic filter with a relatively expensive magnet forming a circular array of pole pieces which co-operate with a plurality of soft iron rods. The permanent magnet can be partially rotated to reverse the polarity of the soft iron rods to dislodge the attracted magnetic particles which fall into a lower chamber for collection.

U.S. Pat. No. 2,317,774 by Kiek et al, shows a permanent filter which allows attraction of magnetic material in the oil in an air gap outside the flow path, but this is a permanent type of filter which has to be serviced.

U.S. Pat. Nos. 1,778,910, 2,014,800, 2,392,624, 2,429,920, 2,721,659, 2,860,787, 2,980,257, 3,127,255, 3,421,627, 3,841,489, 3,887,469, 3,979,288, 4,036,758, 4,053,410, 4,261,815, 4,295,969, 4,298,478, 4,363,729, 4,366,065, 4,450,075, 4,629,558, 4,663,029, 4,759,842, 4,865,730, 5,174,892, and 5,568,869 all disclose various forms of magnetic devices for attracting magnetic materials from fluid (usually lubricating oil or fuel). These filters in general have to be dismantled for cleaning, washing, possible replacement of filter elements, and reassembled, care being taken that all seals and sealing rings are correctly sealed so that no leakage occurs. Also with the magnetic elements disclosed, it is believed that these are not entirely satisfactory in removing most of the magnetic materials. Additionally, the present trend is to increase the ease of servicing oil and fuel filters by making them disposable whereby it is merely necessary for the filter to be removed and disposed and a new filter installed.

As it is also well known, the surface tension of liquids and fuels in particular can be considerably decreased under the influence of treating with a strong magnetic gradient. As a consequence of reduced surface tension, dissolution and mixing of different additives admixed to the liquid, as well as atomizing properties increase to a significant extent. Increased atomizing properties are considered as most advantageous with respect to fuels.

In view of the fact that the nozzles and atomizers of pumps of oil-heated equipment are most sensitive and the cost of regeneration of the feeders and atomizers of internal combustion motors is extremely high, apparatus is needed which can reduce or eliminate harmful effects of abrasive particles having magnetic properties.

Treating with a magnetic field is most important not only in the case of fuels, but it was observed that when water was treated with a magnetic field damaging scale deposition could be reduced or completely avoided on the walls of fittings and pipes in contact with the water. Another known use of a water treated with a strong magnetic field is in production of stronger concrete.

Additional area of utilization of the filter of the present invention is for purifying a fluid containing magnetic particles and more particularly for purifying the cooling fluids of water cooled nuclear reactors. In pressurized water reactors, the pressurized water, which constitutes the primary fluid and which comes into contact with the fuel rods before being sent into the steam generators in order to heat and vaporize, the boiler feed water or secondary fluid, becomes charged, during its circulation in the reactor and in the steam generators, with iron oxide particles formed during the prolonged contact of the water with certain steel parts of the nuclear reactor.

In boiling water reactors, the water in the main circuit comes into contact with the fuel rods and vaporizes. The steam thus produced feeds the turbine. The condensed water becomes charged with particles in the water tank. The water is reintroduced into the reactor and circulates by means of circulating pumps. The oxide particles tend to become activated and to deposit on the fuel assemblies when vaporization takes place. It is very important to remove these oxide particles from the fluid by means of a filter, in order to prevent the amount of oxide in this fluid from becoming excessive and to prevent these particles from becoming activated after having resided in the core and from depositing on the components, making a significant contribution to the activity and to the contamination of the surfaces. This purification of the fluid must of course be carried out while the reactor is in operation in order to ensure continuous purification of the water.

In order to effect this purification, it has been proposed to use an electromagnetic filter comprising a cylindrical envelope filled with beads of a ferromagnetic material, and more particularly steel beads, which are subjected to a magnetization cycle so that these beads can retain the magnetic particles conveyed by the fluid. A filter of this type, which comprises a magnetizing device surrounding the cylindrical envelope in which the beads are located, in order to create a magnetic field capable of magnetizing the beads, is generally arranged in parallel with a pump used for the circulation of the water. An example of this filter can be found in the U.S. Pat. No. 4,304,667 by Dubourg. The design is extremely complex and requires constant reversal of magnetization process.

Therefore, the need exists for a magnetic filter with a simple preferably disposable design capable of removing magnetic particles from a liquid without creating a significant back pressure but at the same time providing high level of purification.

SUMMARY OF THE INVENTION

Accordingly, it is an object of the present invention to overcome these and other drawbacks of the prior art by providing a novel filter containing generally round permanent magnets made for example as spherical balls placed across the flow of liquid in such a way that complete exposure of the flow to the permanent magnets is assured, providing excellent conditions for most if not all magnetic particles to be entrapped within the filter.

It is another object of the invention to provide a filter of a relatively small size that is capable of removing from the liquid all magnetic particles, non-magnetic particles of large size, and most of the particles comprising only in part of magnetic materials, all without significant pressure drop across the filter.

It is yet another object of the invention to provide a filter for purification of a liquid containing magnetic particles with substantially increased operational time so that the time until clogging of the filter and subsequently the repair or replacement intervals are significantly increased.

It is yet another object of the present invention to provide a filter with all or part of the components being disposable for the ease of replacement.

It is a further object of the invention to provide a filter capable of treating the passing liquid with a magnetic field in order to ease the process of atomization down the line, such as in a fuel filter for the internal combustion engine. Water or other non-magnetic liquid can also be treated with a strong magnetic field to achieve various advantages described above such as for prevention of scale deposits or for preparation of concrete.

It is yet a further object of the invention to provide a method for removal of magnetic particles from a liquid by passing that liquid through a plurality of permanent magnets of generally round shape.

The filter of the invention generally consists of two compartments: the magnetic compartment and the common porous filtering compartment. It is highly preferred to place the magnetic compartment ahead of the porous filtering compartment because treatment of passing liquid with a strong magnetic field enhances further filtration in the second compartment. Both compartments may be made as a single unit and be disposable such as for example in case of an oil or fuel filter for an automobile. Alternately, the magnetic compartment may be made removable from the rest of the filter so it can be replaced separately such as in an oil filter for example.

The first magnetic compartment contains a plurality of generally round permanent magnets placed across the liquid flow. Such magnets are preferably made of spherical shape such as magnetic balls. Spherical shape has the advantage of providing the highest magnetic intensity and magnetic gradient and besides is amenable for mass production. Should the shape be somewhat non-round such as an oval for example, the filter of the invention would still perform to some degree. Therefore, for the purposes of this description, the term "magnetic ball" is used to include not only a spherical shape in a strict geometrical sense but also all generally round objects with the shape reasonably close to that of a sphere. All deviations from a spherical shape are considered acceptable and included in the definition of the "magnetic ball" as long as such deviations do not cause any substantial detrimental effect on the performance of the filter as compared with the strictly spherical magnetic balls of the same volume and material.

The polarity orientation of each magnet may be random but it is preferred to orient them all in the same direction for further improvement of the filtering efficiency. The best orientation is that which is perpendicular to the direction of the flow. That in itself promotes the secondary effect of the filter which is treating of the passing liquid with a strong magnetic field and improvement of its viscosity or atomizing properties. The plurality of magnetic balls may be typically placed in a housing made preferably of steel or other soft magnetic metals to close the magnetic field loops and conduct it throughout the first compartment of the filter. In one embodiment, all magnetic balls have the same diameter and are packed closely in a housing with a number of openings for the passing liquid. In a variation of this embodiment, the spaces between the magnetic balls are filled with a number of magnetic balls of progressively smaller diameter to increase the efficiency of the liquid purification without causing substantial pressure drop across the first compartment. It is preferred to select the smaller balls to have a diameter of about 0.15 of the diameter of the bigger balls.

The second non-magnetic porous filtration compartment of the filter is made to pass the liquid through commonly known filtering materials with known porosity such as used in most filters. In a typical case, a large contact area of this material is desirable so the sheet of the filtering material is folded in a star-like pattern. All other commonly known porosity filter materials and configurations may be used as well in the second compartment to remove the particles above the certain size as dictated by the porosity of the material.

After entering the filter of the present invention, the flow of liquid is passing through the first compartment with a mesh container having magnetic balls and creating a magnetic field with strong magnetic intensity across the direction of the flow. Since magnetic balls are packed in such a way that there is no direct path for the liquid flow, it is subjected to multiple turns around the magnetic balls which creates excellent mixing conditions and promotes adhesion of all magnetic particles to the surfaces of the magnetic balls. Other particles such as mixed contaminants having some of magnetic contents as well as the larger non-magnetic particles with the size bigger than the space between the magnetic balls would also be trapped in the first compartment. As a secondary effect, the strong magnetic field increases the atomization properties of the liquid, reduces temporarily its viscosity, improves the mixing of all the liquid components and additives and may reduce its surface tension. All of these secondary effects are useful in such cases as the fuel liquid which proceeds further down the line to the atomizer of the engine so that the ignition and burning characteristics are improved. In addition, the treating of the passing liquid with a magnetic field improves the performance of the second compartment of the filter which leads to a longer service life of the filter. In our tests with the fuel filters for an automobile, the service life of the filter of the present invention was increased (as measured by the automobile travel distance) from about 15,000 miles to about 50,000 miles.

The second compartment of the filter traps all other contaminant particles the size of which is higher then the porosity limit of the filtering material, typically about 10 microns.

For a better understanding of the invention, its operating advantages and the specific objects attained by its uses, reference should be made to the accompanying drawings and descriptive matter in which there is illustrated a preferred embodiment of the present invention.

BRIEF DESCRIPTION OF THE DRAWINGS

A more complete appreciation of the subject matter of the present invention and the various advantages thereof can be realized by reference to the following detailed description in which reference is made to the accompanying drawing in which.

DETAILED DESCRIPTION OF THE FIRST MOST PREFERRED EMBODIMENT OF THE INVENTION

Figure 1:
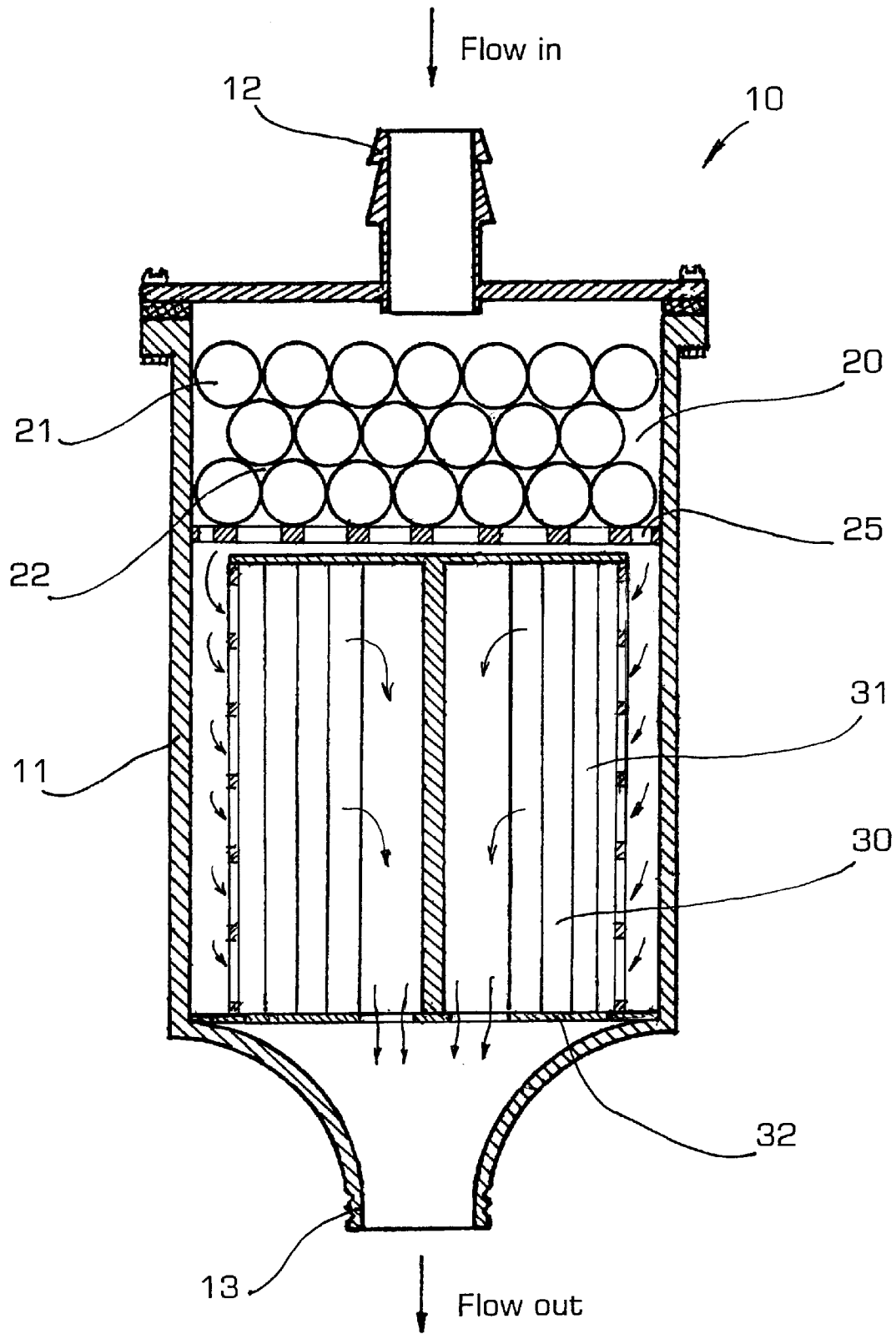
FIG. 1 is a schematic cross-sectional view of the first embodiment of the present invention showing the disposable variation of the design of the filter and FIG. 2 is a schematic cross-sectional view of the second embodiment of the present invention showing another design that can allow for a disposable core portion of the filter removably attached to the rest of the device.

A detailed description of the first most preferred embodiment of the present invention follows with reference to accompanying drawing on FIG. 1 in which like elements are indicated by like reference numerals.

According to the first embodiment and the method of the present invention, the filter (10) consists of a first compartment (20) and the second compartment (30). The filter (10) itself is housed in a housing (11) having the flow inlet (12) and the outlet (13). Both inlet and outlet may be configured as a barbed connector as shown for example for the inlet (12). Alternately, as shown for the outlet (13), it may be configured as having attachment threads to connect to the lines of the rest of a hydraulic system.

The first compartment occupies a portion of the filter housing (11) and separated from the second compartment (30) by an optional perforated wall (25). The perforations of the wall (25) are made large enough not to restrict the flow of liquid but at the same time do not exceed the size of magnetic balls (21) so as not to allow them to escape from the first compartment area (20) into the second compartment area (30).

The first compartment (20) contains a plurality of magnetic balls (21) tightly packed to minimize the spaces (22) therebetween. Magnetic balls of the same size form a certain tightly packed pattern similar to one shown on FIG. 1. In order to utilize better the space (22) between the balls (21), additional smaller magnetic balls may be placed therebetween the balls (21) (not shown on the drawings). The diameter of these smaller balls should be about 0.15 of the diameter of the bigger magnetic balls to utilize fully the existing spaces between the larger balls but not to separate them apart. Such additional magnetic balls would further improve the efficiency of the filter.

In a variation of the device (not shown on the drawing), a second set of magnetic balls may not only have a different diameter but also may be made from a different magnetizable material such as steel. These balls or objects of other shape made from a non-ceramic but still magnetic material would be strongly magnetized in the vicinity of the ceramic round permanent magnets and further improve the function of the filter.

The magnetic poles orientation of individual balls (21) may be random but it is preferred to orient all magnetic fields in parallel and further it is preferred to orient them such that the maximum intensity of magnetic field is perpendicular to the direction of flowing liquid. The housing (11) and the perforated wall (25) may be made of any material but it is preferred to make it out of steel or other similar soft magnetic metal so that they conduct and contain the magnetic field inside the first compartment (20) improving the action of magnetic balls (21).

Magnetic balls (21) may be made from any permanent magnet materials but it is suggested to use inexpensive magnetically hard materials with high intensity such as hexagonal hard magnetic ferrites Sr-ferrite and Ba-ferrite which be described by a chemical formulation $SrFe_{12}O_{19}$ or $BaFe_{12}O_{19}$. It was found that in this case, the strength of magnetic field between the magnetic balls can reach about 120 to 140 mT (same as 1200 to 1400 G, or Gauss units). The use of even more potent magnetic materials for magnetic balls (21) can increase these values even further if necessary.

As the liquid passes through the first compartment (20), it makes multiple turns around the balls (21) since there is no direct path through to the second compartment (30). Therefore, increased mixing conditions promote better liquid filtration and purification because even the smallest magnetic particles at some point would be placed near a strong source of magnetic field, so that the magnetic forces would be much higher than the forces of inertia or gravity attracting and trapping even the smallest magnetic particles within the first compartment (20). At the same time, the spaces between the balls (21) remain opened at all times so that no significant restriction to flow is created. Another advantage of this arrangement is that as the first compartment (20) accumulates more and more or magnetic particles, it remains opened for flow without increasing the resistance for much longer periods of time. It was found in our experiments that even if the volume between the balls (21) is filled by as much as about 70% by trapped contaminants, the liquid can still flow through without appreciable increase in the pressure drop across the filter. As can be understood by those skilled in the art, not only magnetic particles are retained by the first compartment (20) but also mixed particles containing some portion of magnetic materials as well as all magnetic and nonmagnetic contaminants with diameters larger then the space between the balls (21). That aspect of the first compartment (20) relieves the second compartment (30) from being clogged with these larger particles.

A further advantage of the present invention is the ability of the plurality of magnetic balls to act together creating stronger magnetic fields, as opposed to just cumulative action of separate magnets in filters of the prior art. That allows to remove not only fully magnetic particles such as small pieces of metal but also attract and retain contaminants comprising only partially of magnetic materials such as a metal oxide particle.

After passing through the first compartment (20), the liquid flow goes into the second compartment (30) which contains regularly used filtration materials. FIG. 1 illustrates one possible design of the second compartment (30) as having a filtering sheet with known porosity (31) folded in a star-like pattern around the stem (32). The purpose of the second compartment (30) is to trap the smaller non-magnetic particles which have passed through the first compartment (20). As was described above, one of the advantages of having the magnetic portion of the filter located ahead of the porous portion of the filter is in treating the liquid with a magnetic field which temporarily reduces its surface tension and viscosity therefore the liquid is capable of passing through the second compartment with less resistance. After passing through the sheet (31) the liquid flow is collected in the housing (11) and directed towards the outlet (13).

The design of the first embodiment of the invention is particularly suitable for a disposable fuel filter application. In this application, it was determined that the size of magnetic balls should be between about 2 and 20 mm, and preferably between 3 and 5 mm. The total number of magnetic balls should be about 300 which corresponds to a thickness of the pack of magnetic balls of about 25 mm.

Another advantageous application of this design is in the purifying of the cooling water circulating around nuclear reactors.

As can be appreciated by those skilled in the art, there are many other variations of the filter design utilizing magnetic balls which are not shown here but also contemplated by the inventor. They include making only a portion of the filter disposable while reusing the rest of it, providing more stages for further filtration or treatment of the liquid and so on.

DETAILED DESCRIPTION OF THE SECOND MOST PREFERRED EMBODIMENT OF THE INVENTION

Figure 2:
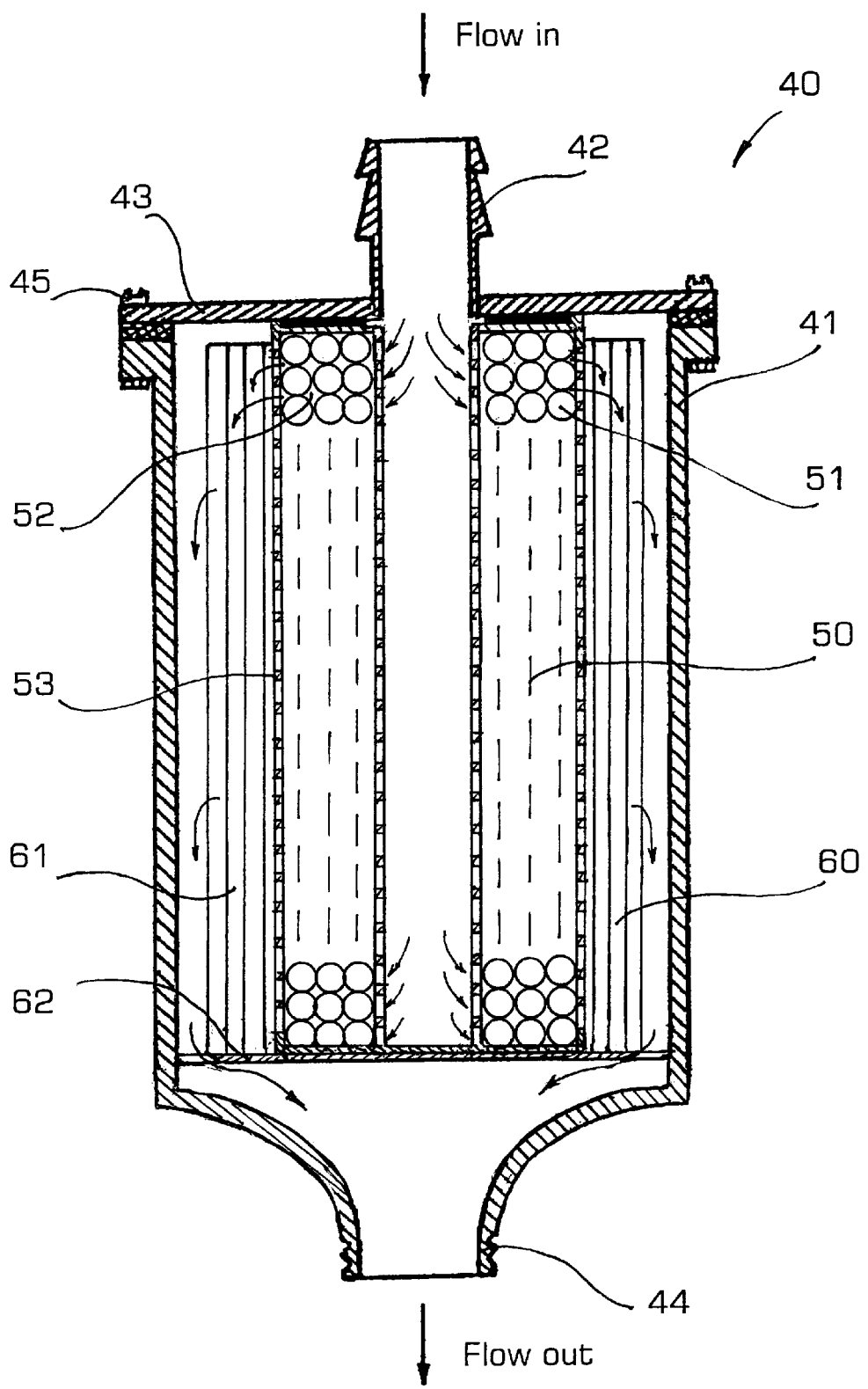

A detailed description of the second most preferred embodiment of the present invention follows with reference to accompanying drawing on FIG. 2 in which like elements are also indicated by like reference numerals.

The filter (40) of the second embodiment and still in accordance with the method of the invention contains the first compartment (50) removably placed in the central area of the second compartment (60), all compartments located within the housing (41) having a plate (43) containing an inlet (42) and attached to the housing (41) by any commonly known attachment means such as a plurality of screws (45).

The first compartment (50) consists of a perforated container (53) filled with magnetic balls (51) tightly packed therein with minimal spaces (52) therebetween. An optional non-magnetic porous insert (not shown on the drawing) may be placed between the magnetic balls (51) and the container (53) to prevent the contact therebetween. The container (53) is preferably made of a magnetically conductive material such as steel. The container (53) is made easily removable so that it is possible to replace it individually without replacing the whole filter (40).

Similar to the first embodiment of the invention, the container (53) has perforations that are somewhat smaller in diameter then the size of the magnetic balls (51) in order to retain them all within the confines of the retainer (53) but at the same time not to increase flow resistance. The material of the container is preferably steel or other soft magnetic metal which serves to complete the magnetic pathway from magnetic balls across the direction of the liquid flow. That allows to contain the strong magnetic field within the first compartment (50) and better trap all the magnetic particles therein.

A slightly different pattern of tight packing is shown on FIG. 2 in comparison to FIG. 1. As in the previous embodiment, additional smaller magnetic balls may be added to utilize better the spaces (52) between the magnetic balls (51) (not shown). Also, the orientation of the magnetic fields is preferred to be all in the same direction which is perpendicular to the direction of the flow.

From the filter inlet (42), the flow of liquid passes to the central portion of the filter into the removable container (53) and around magnetic balls (51) through the spaces (52). The magnetic and other contaminant particles are trapped in the vicinity of the balls (51) while the liquid is treated with a magnetic field and passes through the perforations of container (53) into the second compartment (60) shown to have a filtering material (61) folded in a star-like pattern around the stem (62) housing the container (53). After the smaller non-magnetic particles are removed in the second compartment (60), the liquid is collected by the housing (41) and directed towards the outlet (44). A safety spring-loaded relief valve may be optionally incorporated between the first compartment (50) and the second compartment (60) (not shown on the drawing) to open up the flow path from the inlet straight into the second compartment (60) should the first compartment (50) be entirely clogged.

The design of the second embodiment is particularly suitable for use as an oil filter. Easy replacement of the magnetic portion of the filter would ensure increased time of use for the whole filter and increased quality of purification of the circulating oil. About 500 magnetic balls are estimated to be needed for a typical oil filter.

As with the first embodiment, there are other variations of the filter not shown on the drawing but still contemplated by the inventor. One such variation for example is to eliminate the perforations along the wall of container (53) and therefore organize the liquid flow path to pass through the entire column of magnetic balls without the opportunity of being directed to the sides of the container. Passing through such a column would ensure more complete removal of magnetic particles and treatment of the liquid with magnetic field. Further design changes are envisioned to direct the liquid flow in that case towards the second compartment of the filter.

It should also be mentioned that all of multiple design features individually shown only on FIGS. 1 or 2 are intended to be equally applicable to both embodiments as well as other variations of the present invention. For example, the concept of removable magnetic balls container of the second embodiment and shown only on FIG. 2 can be successfully applied to the first embodiment with some design modifications easily conceived of by those skilled in the art.

Although the present invention has been described with respect to a specific embodiment and application, it is not limited thereto. Numerous variations and modifications readily will be appreciated by those skilled in the art (such as for example a reversal of the filter compartments, adding other filtering and treatment compartments, separating the first compartment from the second compartment by housing it in a separate body as an "add on" component to a standard off-the-shelf filter, organizing the second compartment as a centrifugal filter rather then containing porous material, prepackaging of magnetic balls together for easy final assembly, etc.) and are intended to be included within the scope of the present invention, which is recited in the following claims.

What I claim is:

1. A filter for purifying a liquid containing magnetic particles and treating thereof with a magnetic field, said filter comprising:

a filter housing with a filter inlet and a filter outlet;

a first compartment having a first inlet, a middle portion, and a first outlet, said first inlet being in fluid communication with said filter inlet said first middle portion containing a plurality of permanent magnets of generally round shape, and a second compartment having a second inlet, a second middle portion, and a second outlet, said second inlet being in fluid communication with said first outlet, said second middle portion containing a porous sheet material, said second outlet being in fluid communication with said filter outlet, whereby said permanent magnets being adapted to attract and retrain said magnetic particles as said fluid is passed through said first compartment of said filter.

2. The filter as in claim 1, wherein said permanent magnets being tightly packed in said first middle portion.

3. The filter as in claim 1, wherein said permanent magnets being magnetic balls.

4. The filter as in claim 3, wherein said magnetic balls all having a first diameter.

5. The filter as in claim 4, further comprising a second plurality of magnetic balls, said balls all having a second diameter, said balls placed between the magnetic balls having said first diameter, said second diameter being smaller than said first diameter.

6. The filter as in claim 5, wherein said second diameter being about 0.15 of said first diameter.

7. The filter as in claim 4, wherein said first diameter being in the range between about 2 to about 20 mm.

8. The filter as in claim 7, wherein said first diameter being in the range between about 3 to about 5 mm.

9. The filter as in claim 1, wherein the orientation of magnetic poles of all of said permanent magnets being in the same direction.

10. The filter as in claim 9, wherein said liquid flows through said first compartment in a direction from said first inlet to said first outlet through said first middle portion, the direction of said orientation of magnetic poles being perpendicular to the direction of said liquid flow through said first compartment.

11. The filter as in claim 1, wherein said permanent magnets being made from a hard magnetic material selected from the group consisting of $SrFe_{20}O_9$ and $BaFe_2O_{19}$.

12. The filter as in claim 1, further comprising a perforated wall separating said first compartment from said second compartment.

13. The filter as in claim 1, wherein said filter housing made of soft magnetic material.

14. The filter as in claim 13, wherein said soft magnetic material being steel.

15. The filter as in claim 1, wherein said first compartment being defined by a perforated container, said container being removably placed in said filter housing.

16. The filter as in claim 15, wherein said container made of steel.

* * * * *